Figure 3:
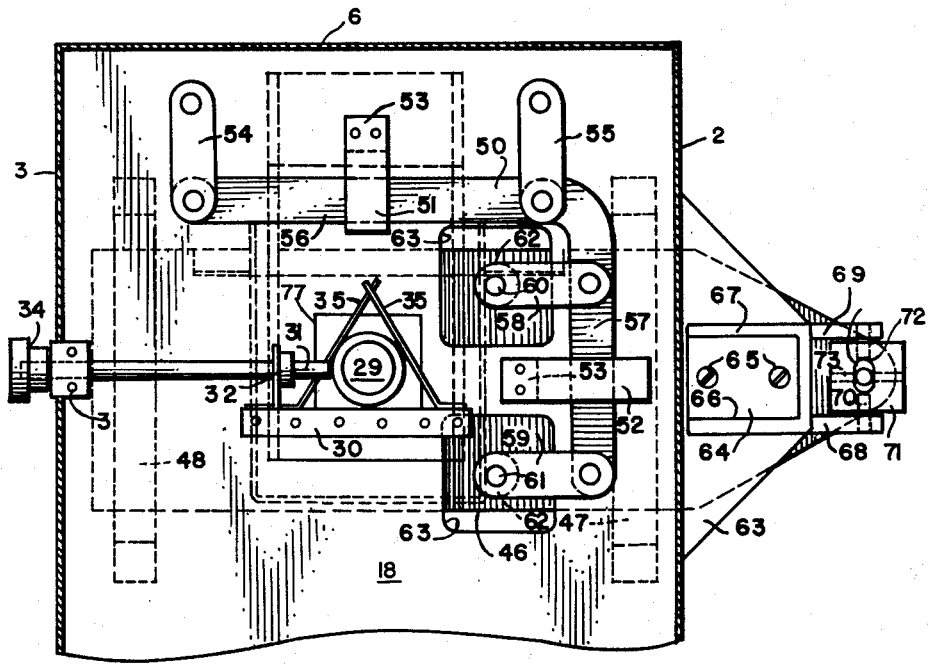

March 30, 1965  P. J. BROWNSCOMBE  3,175,461
VIEWING DEVICE WITH TRANSLATIONAL SCANNING LINKAGE
Filed Nov. 10, 1961  3 Sheets-Sheet 1
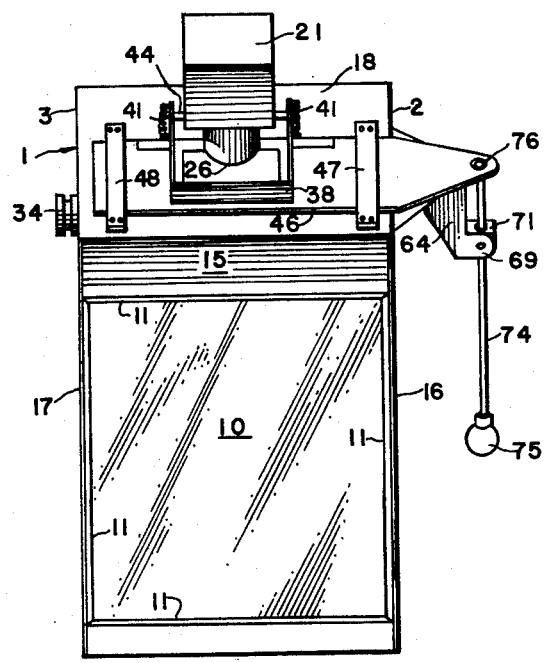
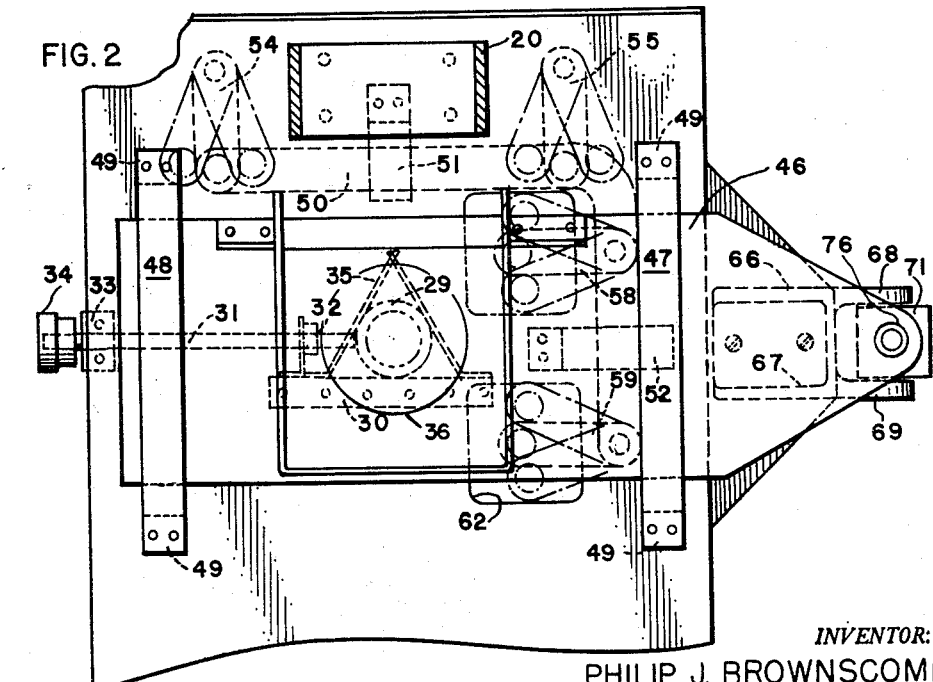
INVENTOR:
PHILIP J. BROWNSCOMBE
BY
ATT'YS March 30, 1965  P. J. BROWNSCOMBE  3,175,461
VIEWING DEVICE WITH TRANSLATIONAL SCANNING LINKAGE
Filed Nov. 10, 1961  3 Sheets-Sheet 2

*INVENTOR:*
PHILIP J. BROWNSCOMBE
BY
ATT'YS

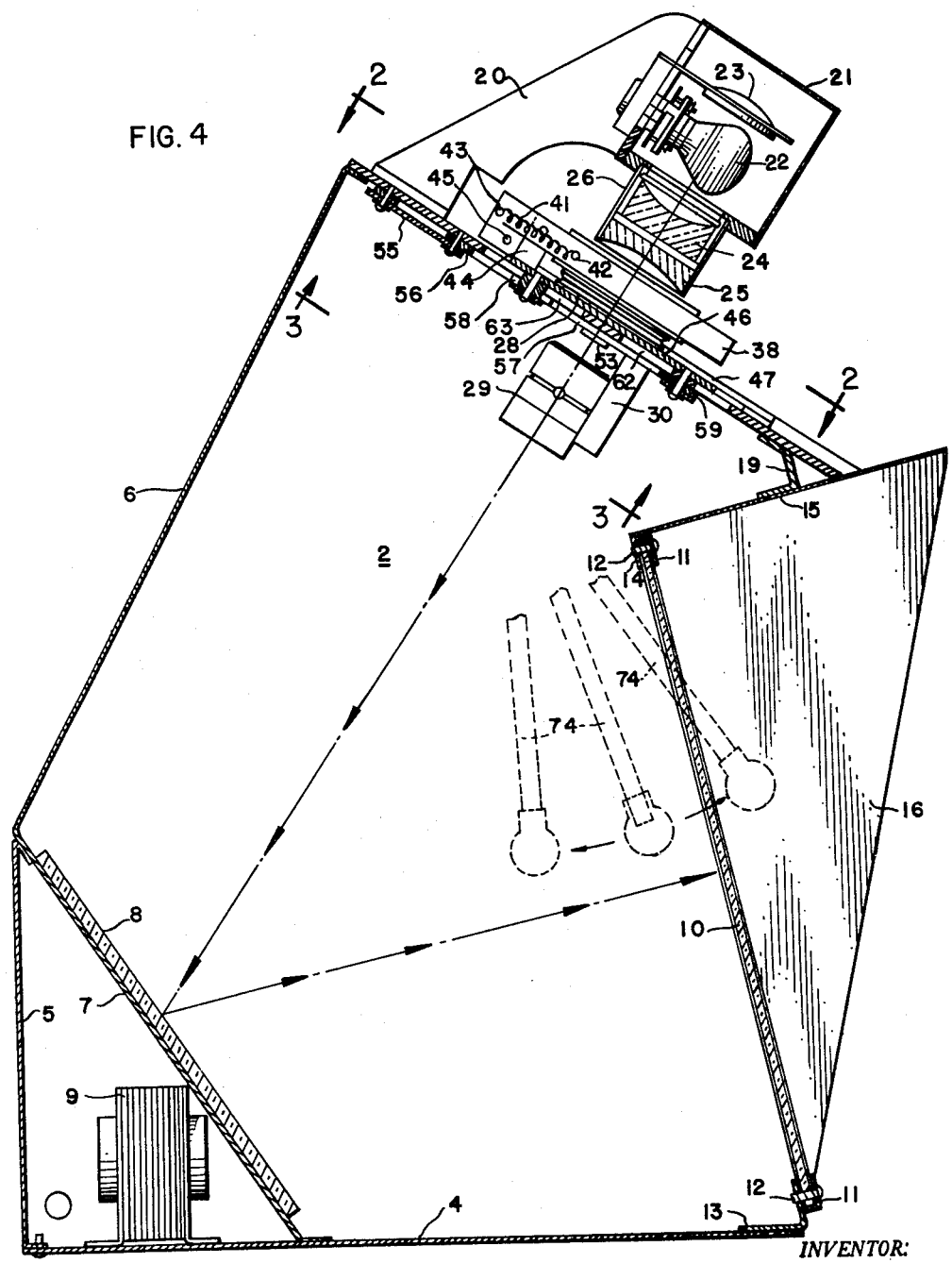

3,175,461
VIEWING DEVICE WITH TRANSLATIONAL
SCANNING LINKAGE
Philip J. Brownscombe, Millington, N.J., assignor to Eugene Dietzgen Co., Chicago, Ill., a corporation of Delaware
Filed Nov. 10, 1961, Ser. No. 151,473
6 Claims. (Cl. 88—24)

This invention in general relates to a viewing device or reader for projecting a microfilm image on a self-contained screen. The reader is designed for convenient viewing of microfilm mounted in standard electric accounting machine aperture cards.

Several types of large viewers are known in the art. These show the entire area of mounted film image on the screen at one time, which is desirable, but the reader is too large for many uses including reference by a draftsman at his table. For several years a need has been recognized for a small reader which would conveniently shown microfilmed drawings to draftsmen for reference purposes. For satisfactory viewing the screen image must be at least half the linear size of the original drawing. Therefore, it is not possible to show a large drawing, 36" x 48" for example, on a small screen in its entirety, and some method of scanning the image over the screen area is required. The method of scanning is important because the readiness with which the user can bring various portions of the image into view determines to a large extent the utility of the reader.

In the reader of this invention, scanning is accomplished by means of a handle or joy stick having a ball joint motion which permits the image to be moved up, down, or in any diagonal direction quickly and easily in one motion. Simplicity of the layout and mechanical parts permits the viewer to be sold at low cost.

A feature of this reader lies in the use of a linkage to prevent rotation of the film carrying plate. Movement of the plate is restricted to one plane by guides made of plastic material such as that sold under the trademark Teflon and is actuated by the joy stick where it overhangs the side of the reader. The linkage device is easy to construct, simple to make accurate and free from excessive backlash owing to the pivot connections and because of these pivots will withstand large twisting movements with no tendency to stick or bind. The plastic guides provide a smooth action.

The linkage which is used to permit translation in any direction without rotation consists of two parallel motion linkages at right angles. An L-shaped member is connected to the reader frame by two short links of equal lengths. Therefore this L-shaped member can move in an arcuate motion relative to the frame but cannot rotate relative thereto. A second set of short links of equal length connects the card carrying plate to the shorter arm of the L-shaped member. The two parallel motions at an angle to each other (preferably a right angle or nearly so) permit the card carrying plate to move in any direction relative to the frame but do not permit rotation. This is the condition which is desired in viewing in order to keep the image erect at all times but to permit it to be moved from side to side and up and down or in any combination of these movements.

The card or the film is held between glass pressure plates to insure flatness of the film. For convenience in one handed operation the plate lifting yoke is equipped with a pair of toggle springs which cause the yoke and upper pressure glass to stay either up or down when it is so moved. Because the pressure glass movement is restricted by the condensing system and this restricted motion is insufficient to operate a toggle satisfactorily, there is a slotted connection between the yoke and the plate holder. This permits the yoke to move sufficiently for good toggle action without moving the upper pressure plate excessively.

Figure 5:
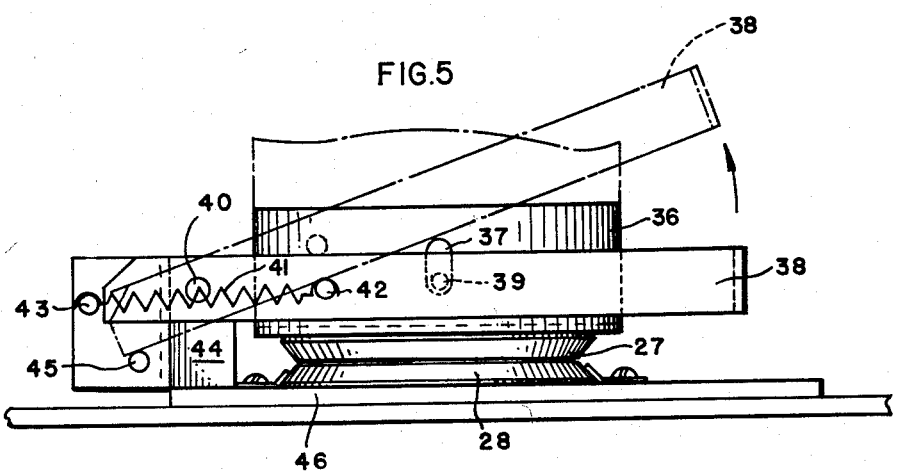

An embodiment of the invention is illustrated in the drawing wherein:

FIG. 1 is a front elevation of the viewing device;
FIG. 2 is a plan view taken on section 2—2 of FIG. 4;
FIG. 3 is a plan view taken on section 3—3 of FIG. 4;
FIG. 4 is a cross sectional view taken in side elevation of the viewing device, and
FIG. 5 is a detail view in side elevation of the card or film holder of the viewing device.

With reference to the drawings, the viewing device comprises a housing 1 having a pair of opposite, parallel side walls 2 and 3. The bottom wall 4 of the housing 1 has mounted along its rearward edge the panel 5 comprising the lower part of the rear wall of the housing 1. The remainder of the rear wall is made up by the sloping panel 6, which is part of a plate from which is also formed the forwardly sloping panel 7. A planar mirror 8 is attached to the panel 7. The space behind the panel 7 is used to house a transformer 9 connected in the electrical circuit (not shown) of the light projector of the viewing device.

The front wall of the housing 1 comprises a translucent screen 10 held in a frame 11 made of L-channels. The frame 11 is attached by screws 12 or the like to an angle bracket 13 mounted on bottom panel 4. The upper side of frame 11 is attached by screws 12 or the like to the bent leg 14 of the rearwardly-sloping, screen-shading plate 15. Triangular shaped end walls 16 and 17 complete the shading enclosure for the screen 10.

The top wall of the housing 1 is a plate 18 mounted on the top edges of the rear wall panel 6 and side walls 2 and 3 and on the angle bracket 19 mounted on plate 15. A projector mounting bracket 20 is mounted on plate 18 adjacent its rear edge. Bracket 20 supports a light projector housing 21 above the plate 18. The housing 21 contains a lamp 22 and a mirror 23. Light is emitted through condenser lenses 24 and 25 contained in condenser lens housing 26.

The projected light passes through the microfilm held between glass clamping plates 27 and 28 and through the focus lens 29. The focus lens 29 is supported on the bar 30 which in turn is attached to the underside of plate 18. Lens 29 is an adjustable lens whose focal position is adjusted by rotating shaft 31 which is rotatably journalled in bearings 32 and 33 and is rotated by turning hand knob 34. Leaf springs 35 frictionally hold the lens in its adjusted position.

The film-holding mechanism comprises a pair of glass plates 27 and 28 between which the film or film-holder card is tightly held. The upper glass plate 27 is held in a carrier 36 which has a vertical slot 37 on each side thereof. The legs of a U-frame arm 38 have inwardly-extending pins 39 which extend into slots 37 to connect the arm 38 and carrier 36. Each side of the arm 38 is pivotally mounted on stub shaft 40. Springs 41, each attached to a pin 42 on each side of said U-frame arm 38 and to a pin 43 on an L-bracket, provide a toggle action on the U-frame arm. The L-brackets are mounted on the rear of a fixed bar 44 in each end of which are also mounted the stub shafts 40. The springs 41 hold the U-frame arm 38 in the up-position shown in phantom lines in FIG. 5 when the arm is raised and in the down-position when the arm is lowered to clamp the film or film card between glass plates 27 and 28. Pin 45 limits the distance to which arm 38 is raised.

The foregoing film or film-card-holding assembly is mounted on a movable plate 46. Plate 46 is movably mounted on the viewing device by a parallel movement linkage hereinafter described. The plate 46 slides on plate 18 beneath strips 47 and 48 which are made of plastic material such as that sold under the trademark Teflon and which are riveted to plate 18 on top of slide spacers 49 which are made of a plastic material such as that sold under trademark Teflon or any other suitable material.

The parallel movement linkage comprises an L-shaped bar 50. This L-shaped bar is on the underside of the plate 18 and is slidably held in position on the underside of the plate 18 by strips 51 and 52, which are made of a plastic material such as that sold under the trademark Teflon and which are riveted to the plate 18 on top of slide spacers 53. The plastic guide strips 51 and 52 restrict movement of the L-bar 50 substantially to a plane parallel with plate 18.

Movement of the L-bar 50 is further restricted by short pivot links 54 and 55. These links are of equal length between pivot axes and are pivotally mounted at one end to the plate 18 and at the other end to a leg 56 of the L-bar 50. When the L-bar moves, the pivot links 54 and 55 provide a parallel movement in which the legs 56 and 57 of the L-bar are in a position parallel to their position in any other location.

Two additional short pivot links 58 and 59 of equal length between pivot axes are pivotally mounted on the leg 57. The links 58 and 59 are pivotally connected to the slidable plate 46 by shafts 60 and 61 which extend through square shaped holes 63 in the plate 18. These holes are of a size sufficient to avoid binding of movement of the parallel movement linkage by contact of shafts 60 and 61 or spacers 62 mounted about said shafts with the walls of the holes in the zone of desired movement of the plate 46.

Thus, short links 54 and 55 allow parallel movement of plate 46 in a primarily lengthwise vector, and short links 58 and 59 allow parallel movement of plate 46 in a vector primarily transversely of plate 18. Each link pair, of course, also gives a movement vector, of usually lesser magnitude than its primary movement vector, in a direction at right angles to the direction of primary movement.

The ultimate effect of the parallel movement linkage comprising plate 46, L-bar 50 and short link pairs 53, 54 and 58, 59 is that plate 46 can be moved in its plane of movement in any direction without rotation of plate 46 relative to plate 18 whereby the film maintains a constant orientation with respect to its longitudinal and transverse axes.

The plate 46 is actuated by a joy stick mechanism mounted on a side of the cabinet 1. This mechanism comprises a plate 63 extending outwardly from the side 2 of the cabinet on the underside of plate 46. A support bracket 64 is attached by screws 65 to the underside of plate 63. Bracket 64 has a pair of downwardly and outwardly extending legs 66 and 67, each having outwardly projecting legs 68 and 69, respectively, at their lower ends.

The legs 68 and 69 each support a stub shaft 70. Stub shafts 70 pivotally carry pivot block 71 having an ovular hole 72 extending therethrough. A shaft 73 extends through block 71 and hole 72 at right angles to the stub shafts 70. The shaft 73 extends through and pivotally supports the shaft 74 of a joy stick having at one end a knob 75 and at the other end a ball socket joint 76 connecting the joy stick to the plate 46. The mounting of the shaft 74 in the pivot block 71 and the ball socket joint 76 are universal joints allowing movement of the joy stick in any direction and responsive movement of the plate 46 in any direction in the plane of movement of the plate. Rotation of the plate 46 in its plane of movement is prevented by the parallel linkage movement previously described.

Light from the projector bulb 22 passes through the image-containing sheet, e.g., the film, held between clamping plates 27 and 28. It passes through the square hole 77 in the side 18 of the cabinet 1 and through the adjustable focus lens 29 to the mirror 8. The light is reflected by this mirror to the screen 10 where the enlarged image from the film can be viewed. Various portions of the film image can be viewed by moving the joy stick 74, which in turn shifts plate 46 and the film held by clamping plates 27 and 28.

This invention is hereby claimed as follows:

1. A viewing device comprising a cabinet, a light projector on said cabinet, a plate slidably mounted on said cabinet, means on said plate for holding an image-containing sheet, an L-bar having one leg of the L pivotally connected to a pair of parallel pivot links pivotally mounted on said cabinet, a second pair of parallel pivot links pivotally connected at one end of each link to the other leg of said L-bar and connected at the other end of each link to said plate, and handle means connected to said plate for moving said plate and its associated linkage.

2. A viewing device comprising a cabinet, a light projector on said cabinet, a plate slidably mounted on said cabinet, means on said plate for holding an image-containing sheet, an L-bar having one leg of the L pivotally connected to a pair of parallel pivot links pivotally mounted on said cabinet, a second pair of parallel pivot links pivotally connected at one end of each link to the other leg of said L-bar and connected at the other end of each link to said plate, a joy stick mounted on a side of said cabinet by a universal joint, and an end of said joy stick being connected to said plate by a universal joint.

3. A viewing device comprising a cabinet, a viewing screen mounted on said cabinet, a light projector mounted on said cabinet, a plate slidably mounted on said cabinet with holding means mounted on said plate for holding an image-containing sheet in the light projection path of said light projector, plastic strips extending across said plate, said strips holding said plate on said cabinet for movement in a single plane and parallel movement linkage connecting said plate and said cabinet whereby the image on said sheet which is projected to said screen can be shifted by parallel movement of said plate without rotation of said image.

4. A viewing device comprising a cabinet, projector mounted on a wall of said cabinet, a plate slidably mounted on the outer surface of said wall beneath said projector, transparent clamping means mounted on said plate for holding therein an image-containing sheet, an L-bar positioned inside said cabinet, said L-bar having one leg of the L pivotally connected to a pair of parallel movement pivot links, said links being pivotally mounted on the inside of said wall, a second pair of parallel pivot links pivotally connected at one end of each link to the other leg of said L-bar and connected at the other end of each link to said plate, and handle means connected to said plate for moving said plate and its associated linkage.

5. A viewing device comprising a cabinet, a projector mounted on a wall of said cabinet, a plate slidably mounted on the outer surface of said wall beneath said projector, transparent clamping means mounted on said plate for holding therein an image-containing sheet, an L-bar positioned inside said wall, said L-bar having one leg of the L pivotally connected to a pair of parallel movement pivot links, said links being pivotally mounted on the inside of said wall, a second pair of parallel pivot links pivotally connected at one end of each link to the other leg of said L-bar and connected at the other end of each link to said plate, guide strips mounted on said surface and extending across said plate and said L-bar to hold them in a plane during movement thereof, and handle means connected to said plate for moving said plate and its associated linkage.

6. A viewing device comprising a cabinet, light projector means on said cabinet, a movable member, means on said member for holding an image-containing sheet in the light projection path of said light projector means, means restricting movement of said member in a plane substantially normal to said light projection path, an L-bar having one leg of the L pivotally connected to a pair of parallel, substantially identical pivot links pivotally mounted on said cabinet, a second pair of parallel, substantially identical pivot links pivotally connected to the other leg of said L-bar and pivotally connected to said member, and manually-manipulatable means operatively connected to said member for moving said member and its associated linkage.

References Cited in the file of this patent

UNITED STATES PATENTS

| | | |
|---|---|---|
| 2,198,169 | Kallusch | Apr. 23, 1940 |
| 2,240,398 | Huitt | Apr. 29, 1941 |
| 2,346,074 | Hopkins | Apr. 4, 1944 |
| 2,369,248 | Pratt | Feb. 13, 1945 |
| 2,390,065 | Gelb | Dec. 4, 1945 |
| 2,701,979 | Pratt et al. | Feb. 15, 1955 |
| 2,823,582 | Gray | Feb. 18, 1958 |
| 3,072,013 | Pratt | Jan. 8, 1963 |

FOREIGN PATENTS

| | | |
|---|---|---|
| 653,889 | Great Britain | May 30, 1951 |